United States Patent [19]  [11]  4,116,654
Trehu  [45]  Sep. 26, 1978

[54] LOW ATTENUATION, HIGH STRENGTH OPTICAL FIBER WITH SILICA FILAMENT CORE

[75] Inventor: Yves Michel Trehu, Wilmington, Del.

[73] Assignee: E. I. Du Pont de Nemours and Company, Wilmington, Del.

[21] Appl. No.: 770,462

[22] Filed: Feb. 22, 1977

[51] Int. Cl.² ............................ G02B 1/10; G02B 5/14
[52] U.S. Cl. .......................................... 65/3 C; 264/1; 427/163
[58] Field of Search ............................ 427/163; 65/3 C; 428/373; 264/1; 350/96 M

[56] References Cited

U.S. PATENT DOCUMENTS

3,480,458  11/1969  Dislich et al. .................. 350/96 M
3,623,903  11/1971  Dislich et al. .................. 350/96 M

*Primary Examiner*—James R. Hoffman

[57] ABSTRACT

Low attenuation, high strength optical fiber is made by drawing a silica filament core at a temperature from 2040° C. to 2140° C. and melt coating onto it cladding polymer having an index of refraction lower than that of the silica core by extrusion at a draw-down ratio from 1.2 to 2.0.

10 Claims, 3 Drawing Figures

LOW ATTENUATION, HIGH STRENGTH OPTICAL FIBER WITH SILICA FILAMENT CORE

BACKGROUND OF THE INVENTION

The present invention relates to optical fiber having a silica filament core and a thermoplastic cladding which has an index of refraction lower than that of the core.

Optical fibers are well known in the art for transmission of light along a length of filament by multiple internal reflections of light. Great care is taken to minimize light losses along the length of the filament, or, in other words, internal reflection is made as close to total as possible so that light applied to one end of the optical filamentary material is efficiently transmitted to the opposite end of the material. The light transmitting portion or core of the optical filamentary material is surrounded by a cladding having an index of refraction lower than that of the core, so as to minimize the escape or absorption of light along the length of the filament. This cladding is normally chosen to be transparent since an opaque cladding tends to absorb light.

An important consideration in formation of optical fibers is minimization of any factor which increases the attenuation of transmitted light within such fiber.

Where low attenuation of transmitted light in an optical fiber material is critical, the preferred material for the filamentary core is silica, since it has one of the lowest attenuations presently known. Suitable cladding materials known in the art include thermoplastic polymers which have an index of refraction lower than that of the core; and which preferably are substantially amorphous.

SUMMARY OF THE INVENTION

The present invention relates to a process of forming an optical fiber comprising a silica filament core and a thermoplastic polymer cladding having an index of refraction lower than that of the core by
 (a) drawing a silica filament core from a molten mass of silica, and
 (b) melt coating thermoplastic polymer having an index of refraction lower than that of the core onto the silica filament core;
the improvement comprises:
 (i) in step (a), drawing the silica filament core at a temperature from 2040° C. to 2140° C. and
 (ii) in step (b), melt coating the polymer by extrusion at a draw-down ratio from 1.2 to 2.0 without the filament core having touched a solid surface.

DETAILED DESCRIPTION OF THE INVENTION

In formation of an optical fiber in the present invention, first a silica filament core is drawn from a molten mass of silica. Although drawing temperatures of at least 2000° C. have been employed in the prior art, for purposes of the present invention, the drawing temperature is from 2040° C. to 2140° C. The reason for this temperature range is to obtain a high strength silica core with a controlled diameter. It has been found that brittleness of the silica core material increases to an intolerable extent if it is drawn at temperatures below 2040° C. It has also been found that when the temperature is too high there is difficulty in control of caliper of the core, and for this reason the uppermost drawing temperature should not be greater than 2140° C. In general, temperatures in the upper part of the indicated range will be used at the higher drawing rates.

After the silica filamentary core is drawn at elevated temperature in an inert atmosphere such as nitrogen, the fiber is cooled, usually in air, and melt coated by extrusion with a thermoplastic cladding polymer having an index of refraction lower than that of the core. The cladding polymer applied to the optically transparent core is optically transparent and has an index of refraction at least 0.1% lower than that of the silica core, and preferably at least 1% lower.

Examples of suitable cladding materials include those disclosed in British Patent Specification No. 1,037,498 such as polymers and interpolymers of vinyl fluoride, vinylidene fluoride, tetrafluoroethylene, hexafluoropropylene, trifluoromethyltrifluorovinyl ether, perfluoropropyltrifluorovinyl ether and fluorinated esters of acrylic or methacrylic acids having the structure wherein X is selected from the group consisting of F, H, or Cl, and $n$ is an integer of from 2 to 10, $m$ is an integer from 1 to 6 and Y is either $CH_3$ or H, and copolymers therof with esters of acrylic and methacrylic acids with lower alcohols such as methanol and ethanol. Copolymers of where X, Y, $m$ and $n$ are as defined above with the methyl and ethyl esters of acrylic and methacrylic acids and which are substantially amorphous constitute a preferred class of polymers.

Fluorinated polymers containing pendant side chains containing sulfonyl groups such as disclosed in U.S. Pat. No. 3,849,243, and fluorine-containing elastomers such as those disclosed in U.S. Pat. Nos. 2,968,649 and 3,051,677 can also be used. Others include copolymers of tetrafluoroethylene with other monomers such as hexafluoropropylene and perfluoroalkyl perfluorovinyl ether as disclosed in U.S. Pat. Nos. 2,946,763 and 3,132,123. Modified and unmodified copolymers of tetrafluoroethylene and ethylene as disclosed in U.S. Pat. No. 2,468,664 can also be used.

Cladding polymers which are not crystalline, i.e., which are substantially amorphous, are preferred, because optical fibers clad with a crystalline polymer tend to have higher attenuations of transmitted light than those coated with an amorphous polymer. Optical fibers clad with a crystalline polymer, however, do have utility, particularly when only a short length of optical fiber or cable is needed. When the optical fiber or cable will be used in short lengths where it is subjected to high temperatures, the cladding should be a polymer which will not soften at the high temperatures, and many polymers suitable in such cases tend to be crystalline. When a crystalline polymer is employed as cladding, however, best results (i.e., lowest attenuation of transmitted light) are attained when the optical fiber is made under such conditions that the polymer cladding has the highest transparency attainable by quickly quenching it after polymer extrusion.

Figure 1:
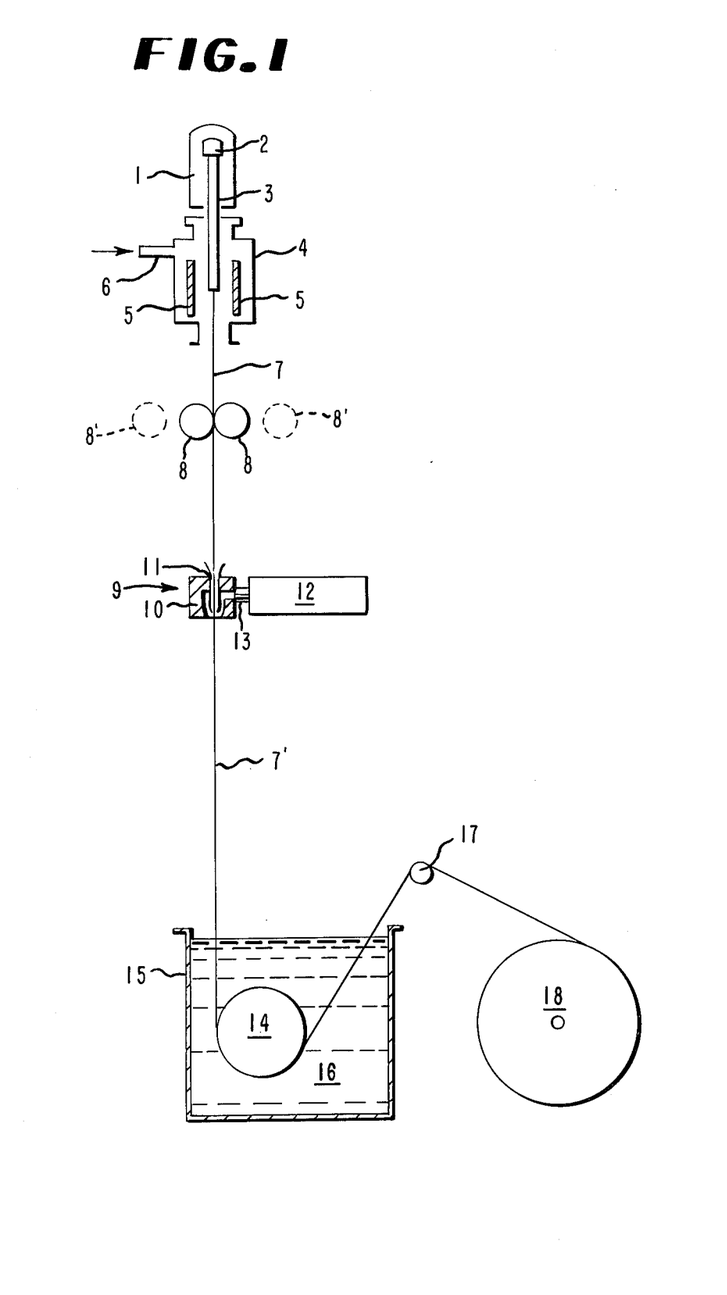
FIG. 1 is a schematic representation of a process showing formation of an optical fiber by drawing a silica filament core and coating with molten thermoplastic cladding polymer, followed by windup of the optical fiber on a take-off drum.

FIG. 1 schematically depicts a process of formation of an optical fiber. A variable speed rod feeder 1 having a clamp 2 which holds a silica rod 3 slowly feeds the rod into a spinning furnace 4. Although the furnace depicted in the figure is a tungsten electric resistance furnace containing heating elements 5, other means to melt the silica rod such as an induction heater, laser, or graphite furnace can also be used. A gas inlet 6 is used to maintain an inert atmosphere within the furnace by introduction of an inert gas such as nitrogen. From the molten tip of the silica rod a silica filament core 7 is drawn by pinch rolls 8, which are withdrawn from contact with the core by removal to remote positions 8' after complete startup. A cladding polymer is melt coated onto the silica filament core with melt coating die 9 which comprises a die body 10 and filament guide 11 through which the silica filament core passes. Cladding polymer is fed into the die by extruder 12, which can be of any conventional type such as a screw or ram extruder, through die adaptor 13. After formation of the optical fiber 7' comprising core and cladding, it passes in contact with an alignment roll 14, roll 17, and is wound onto take-off reel 18. Optionally, alignment roll 14 may be submerged in a quenching liquid 16 in quench tank 15. In some cases, the quench tank and liquid are not needed, in particular when the distance from the coating die 9 to the alignment roll 14 is long enough for the cladding polymer to solidify before it contacts roll 14. However, when the cladding polymer is a polymer which tends to crystallize, it should be quenched in liquid 16 to maximize its transparency, because the optical fiber will have a higher attenuation if the polymer is permitted to cool slowly. Important spinning parameters include (1) the ratio of the filament pulling rate to the rod feeding rate, which defines the filament diameter as a function of the rod diameter, and (2) the rod temperature in the draw-down region.

It is necessary in the present process to apply the cladding polymer by melt coating by extrusion. An important coating parameter is the extruder throughput, which in the case of a screw extruder, is controlled by the screw rotational speed. It defines the cladding thickness for a given spinning rate. Melt temperature is an independent variable which can be used to maintain acceptable pressures in the coating die. The melt temperature will, of course, also be determined in part by the melting point of the particular polymer chosen for the cladding. The pressure at the die orifice can fall in a wide range, and will vary with such things as the die design, particular polymer used, extrusion rate, etc. Pressures in the range of 25 to 60 kg/cm (350–850 psi) have been found convenient, but lower and higher pressures can also be used.

It is necessary in the present process for the polymer cladding operation to be in line with spinning, and for the extruder throughput to be adjusted as a function of spinning rate to keep a melt draw down ratio from 1.2 to 2.0, and preferably from 1.4 to 1.8. Draw down ratio is the ratio of the open area of the die orifice, i.e., the area of the die orifice less the area of the cross-section of the silica fiber, to the area of a cross-section of the thermoplastic cladding layer of the clad optical fiber.

It is critical to maintain the draw down ratio within the indicated limits to insure a close match between the linear velocities of the silica fiber and of the thermoplastic melt at their point of contact. Too large a mismatch between these two velocities brings about a rough interface, due to melt fracture if the silica surface is moving much faster than the melt, or due to wrinkling if the melt is moving faster than the silica surface. A rough interface in turn leads to excessive light scattering and increased attenuation of transmitted light. This requirement is believed to apply for all thermoplastic cladding materials.

It has been found that contact of the filament core with any solid surface, for example, a surface which acts to guide the filament core, during production of the optical fiber is deleterious, because it results in poorer optical fiber performance as measured by an increase in attenuation of transmitted light. For this reason it is most preferable that no contact of the core with a solid surface takes place during formation of the optical fiber. The absence of contact with a solid surface refers to steady state operation and excludes any initial startup procedure. For example, use of pinch rolls during startup is required to feed the silica filament core to a coating die. Thereafter, in the present invention the guide rolls are withdrawn. Also, the filament core ordinarily touches interior wall portions of the coating die during startup before it is centered properly to avoid contact with any solid surface.

Figure 2:
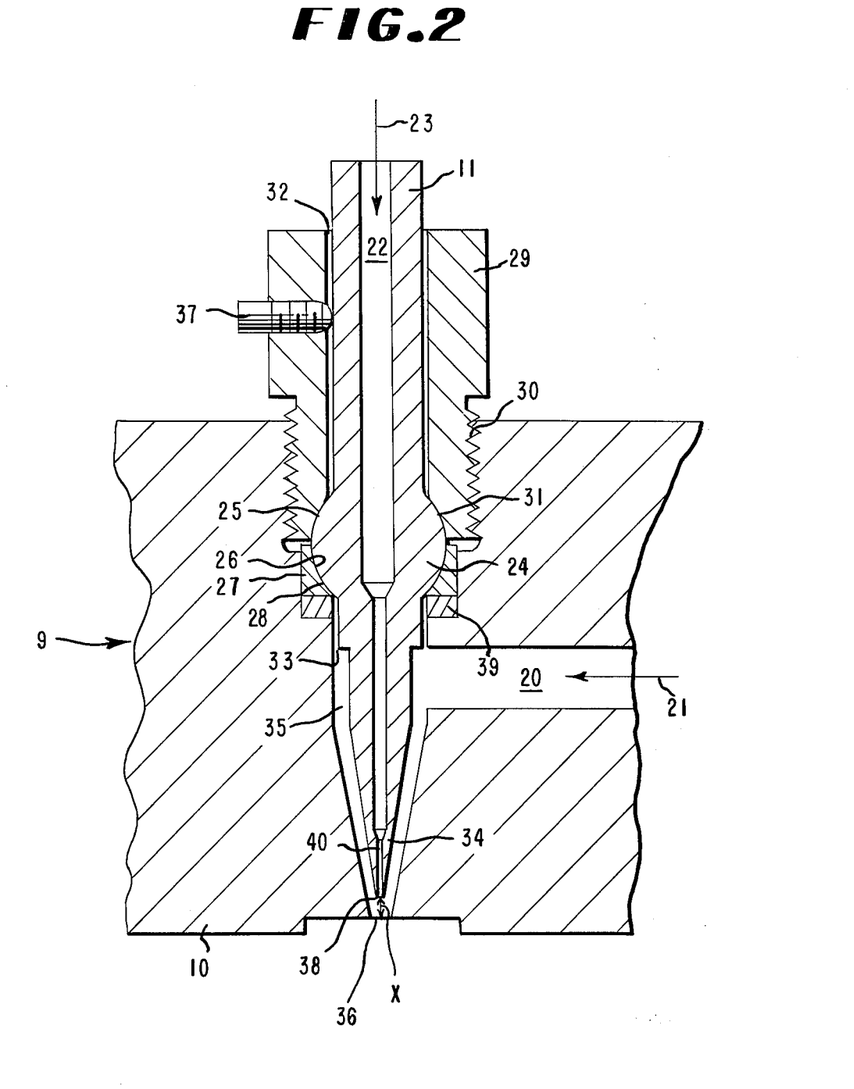
FIG. 2 is a cross-sectional view of a coating die for extrusion of a thermoplastic cladding polymer onto a silica filament core.

A preferred manner of ensuring that the silica filament core 7 does not contact any solid surface within the coating die prior to coating is to use a melt coating die 9 of the type shown in FIG. 2. The die 9 comprises a die body 10 having a channel 20 through which molten polymer is forced in the direction shown by the arrow 21 by extruder 12 indicated in FIG. 1. Die 9 also comprises filament guide 11 having a channel 22 through which the silica filament core 7 passes in the direction of arrow 23. Filament guide 11 has a spherical segment 24 defined by upper and lower spherical segmental surfaces 25 and 26, respectively. The lower spherical segmental surface 26 rests against seat 27 which has a cooperating spherical segmental surface 28. Filament guide 11 is held in die body 10 by retaining sleeve 29, which engages die body 10 at the threaded portion 30 and which has at its lower end a spherical segmental surface 31 which bears against upper spherical segmental surface 25 of the guiding tip. Retaining sleeve 29 serves to urge filament guide 11 against seat 27. Die body 10, filament guide 11 and retaining sleeve 29 are fabricated so as to provide clearances 32 and 33 between these three elements. The clearances are of such dimensions to allow a small degree of rotation of spherical segment 24 of filament guide 11 against spherical segmental surfaces 25, 26 and 28, which in turn makes it possible to align filament guide 11 coaxially with the bore 35 in die body 10. When so aligned, the extended axis of tip portion 34 meets the center of extrusion orifice 36, and the polymer cladding formed on the silica core will be uniform, or at least nearly as, i.e., without thick and thin portions. Furthermore, any tendency to form a cladding of non-uniform thickness around the core can be corrected by positioning the tip portion slightly off-center, if necessary. Adjustment of the position of filament guide 11, and thus of its tip portion 34, is effected by means of three set screws 37, only one of which is shown in this sectional drawing, positioned equidistant from one another in the upper portion of retaining sleeve 29. The diameter of the narrowest portion of channel 22, which is within the tip portion 34, is somewhat greater than the diameter of the silica filament core so that the filament can pass through the filament guide 11 without making any contact with it. The end 38 of tip porion 34 is recessed in the bore 35 a distance $x$ upstream from the extrusion orifice 36 for reasons which will be explained hereinafter. The distance $x$ is adjusted by placement of a spacer 39 in die body 10 before seat 27 is put into position during assembly of the die 9. The thickness of the spacer 39 to be used is determined by the distance $x$ by which one desires to recess end 38 upstream from orifice 36.

In such a die 9, the end 38 of the filament guide 11 is recessed the distance $x$ sufficiently within bore 35 of die body 10 to allow for some flow of the molten polymer up into the narrow bore 40 of the tip portion 34. Typical values for the recess distance $x$ are 0.5 to 1 mm. The recess distance $x$, however, is not critical, higher and lower values being possible, so long as there is some flow of polymer up into the narrow bore 40 of the tip portion 34. The clearance between the silica filament and the inside of narrow bore 40 is made large enough to allow polymer flow up into bore 40 but small enough to maintain good concentricity between core and cladding. It was found that unless some polymer flows up the guiding tip, only high and erratic attenuations could be attained.

Figure 3:
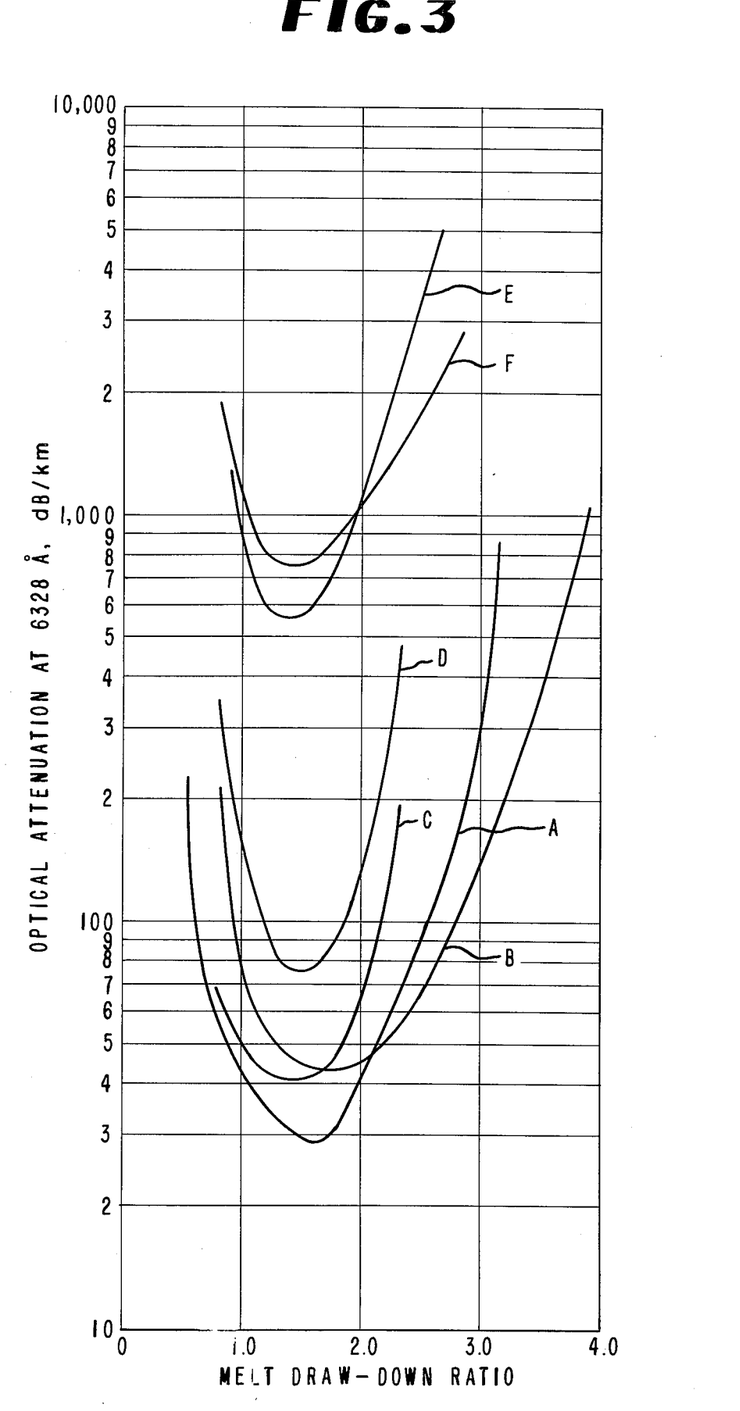
FIG. 3 is a graph showing the effect of varying melt draw down ratio on attenuation of transmitted light in an optical fiber for various polymers.

FIG. 3 shows how the optical attenuation of the optical fiber made by the process described above varies as a function of melt draw-down. Curves A and B are obtained for a 0.65 mm (0.25 inch) die opening, curve A by keeping the extruder thoughput constant and progressively increasing the spinning rate, and curve B by keeping the spinning rate constant and varying the extruder througput. Curve C was obtained with a 0.9 mm (0.036 inch) die opening varying both the extruder throughput and spinning rate. All curves define the same optimum draw-down ratios and it is believed that the data from which curves A, B and C were drawn could be considered to define one single curve, and that, if it were possible to measure draw-down ratio and attenuation with greater precision, the data would define but a single curve. They establish clearly that no substantial degree of either elastic swelling or draw down of the melt as it leaves the die can be allowed to take place for optimum results, this independently of die geometry, spinning rate or polymer throughput per se.

Both criteria for optimum results described above, i.e. a very low melt draw down ratio, and allowing for flow of molten polymer up the fiber guiding tip, are contrary to all the teachings of the wire coating art.

The diameter of the optically transparent silica filament core varies from relatively thin to relatively thick core constructions. A suitable diameter range is 50 to 300 μm. If the light source is large, e.g., from an LED (light emitting diode), a thick core has the advantage in its ability to capture a greater proportion of incident light, but has the disadvantage of having a larger minimum bending radius. If a light source is small, e.g., a laser, a relatively thin core is suitable for capturing incident light and has the advantage of a smaller minimum bending radius. The diameter of the core will be highly uniform when the rate at which the silica rod is fed to the furnace and the rate of drawing of the filament are each essentially constant.

Since the cladding material reflects light traveling through the core, the thickness of the sheath generally is not critical. An example of a suitable range of thickness of this cladding which can be made by the present invention is about 50 to 500 μm. Excessive thicknesses can reduce flexibility of the final cable.

To further illustrate the present invention the following examples are provided. In the examples, measurements of attenuation are accurate to approximately ± 10%.

EXAMPLE 1

A high temperature, electric resistance furnace was mounted about 4 feet above the crosshead of a 1-inch screw extruder as illustrated in FIG. 1. The crosshead die at the end of the extruder was as shown in FIG. 2, the die orifice being 0.65 mm (0.025 inch) in diameter. The filament guide tip had a 0.3 mm (0.012 inch) inside diameter at its extremity and was recessed 0.8 mm ± 0.1 mm (0.032 ± 0.004 inch) upstream from the face of the die.

A 9-mm diameter "TO-8 Commercial" fused silica rod was fed into the furnace at a constant rate $r_1$ by an adjustable speed, screw feeding system. The tip of the rod melted at the center of the furnace and a silica filament was pulled from this molten tip at a constant rate $r_2$ by a pair of pinch rolls. The spinning rate, $r_2$, was first adjusted to 6 m/min. The ratio $r_2$ to $r_1$ was kept at 2000 so as to yield a 200-μm fiber from the 9-mm rod.

The temperature at the center of the furnace was monitored by a thermocouple; the signal from the thermocouple was used to regulate the power input to the heater elements so as to maintain the temperature constant within ± 5° C. The actual temperature of the molten tip of the rod or spinning temperature was measured with a pyrometer.

Also, extrusion of polymer was begun, using a copolymer of 20% by weight of methyl methacrylate and 80% by weight of ($p$ is 1 to 8, with ca. 90% (wt./vol.) being that where $p$ is 2 and 3) having an inherent viscosity of 0.50 (measured on a 0.5% by weight solution in 1,1,2-trichloro-1,2,2-trifluoroethane at 20° C.) and a melt index of 6 at 230° C. (measured by ASTM D-2116-66 with an orifice of 2.095 mm and a weight of 2160 gm). The extruder barrel temperatures employed ranged from 150° C. near the hopper to 200° C. at the die adapter. The die itself was kept at 230° C. The screw rotating speed was adjusted to keep the die pressure between 400 and 500 psi. The polymer filament leaving the die was threaded through a quench tank around an alignment wheel and onto a take-off drum as shown in FIG. 1 with an air gap of about 3 feet from the extrusion die to the surface of the quench liquid. The velocity of the take-off drum was kept slightly above the spinning rate.

Once both the filament core spinning and polymer extrusion operations were stabilized, the silica filament was fed into the extruder crosshead die. Due to the somewhat higher speed of the take-off drum, the slack in the filament between pinch rolls and die disappeared progressively. As soon as this slack was not noticed anymore, the pinch rolls were opened and moved out of the way. The take-off drum velocity was then adjusted at 6 m/min, and the rod feed velocity at $3 \times 10^{-3}$ m/min to make a 200 μm silica filament, after which the extruder screw speed was itself adjusted to yield a 600 μm (0.024 inch) diameter clad fiber. From then on, the silica filament was pulled by the take-off drum without contact with anything solid from the time it was formed until it was coated. Alignment of the furnace and extruder crosshead are critical to avoid scratching of the silica filament by the coating die.

A series of runs was made with the above spinning and coating conditions and the spinning temperature varying from 2000° C. to 2140° C. The properties of the clad fiber are shown in Table I.

TABLE I

| Spinning Temperature (1) (° C) | Fiber Attenuation (2) (dB/km) | Clad Fiber Toughness (3) | General Spinning Behavior |
|---|---|---|---|
| 2000 | 40–50 | very brittle | Due to brittleness only lengths below 20 m could be spun continuously. |
| 2020 | 40–50 | very brittle | As above but lengths from 50 to 100 m. |
| 2060 | 40–50 | brittle | Continuous spinning, good caliper control. |
| 2080 | 35–45 | tough | Continuous spinning, good caliper control. |
| 2100 | 35–45 | very tough | Continuous spinning, good caliper control. |
| 2140 | 110–150 | very tough | Caliper control becoming marginal. |

(1) Spinning temperature measured with a pyrometer focused on the melted tip of the rod. Reproducible to ± 10° C.
(2) Fiber attenuation measured at 6328Å with He-Ne laser light source, collimated light.
(3) Fiber strength evaluated by wrapping the fiber once (i.e. a 360° turn) around a ¼" diameter mandrel and pulling on one end of the fiber until a 1-m length of fiber has been pulled in sliding contact around the mandrel. For no breaks, fiber labeled very tough. For one break, tough. For 1 to 5 breaks, brittle. Above 5 breaks, very brittle.

EXAMPLE 2

Using the same operating procedure, coating die, silica rod type and cladding polymer as in Example 1, the spinning temperature was fixed at 2125° C. The spinning rates were varied from 3 to 15 m/min keeping the ratio of spinning to feeding rate constant to keep making 200 μm (0.008 inch) diameter silica fibers. The extruder screw speed had previously been adjusted to yield a 600 μm (0.024 inch) diameter clad fiber when operating at 6 m/min. Thus at lower spinning rates the melt was allowed to recover elastically to yield clad fiber having a diameter larger than the die opening. At higher spinning rates melt draw down yielded clad fibers of smaller diameter than the die opening. The effect of these variations in melt drawn down on fiber optical attenuation is shown in Table II, part 1, and FIG. 3, curve A.

EXAMPLE 3

Using the same operating procedures, coating die, silica rod type, cladding polymer and spinning temperature as in Example 2, spinning rate was kept constant at 12 m/min, again with a ratio of 2000 between spinning and feeding rates so as to make 200 μm (0.008 inch) diameter silica filaments. The extruder screw speed, however, was varied to make clad fiber diameters from 670 μm down to 370 μm. The resulting effect on fiber attenuation is shown in Table II, part 2, and in FIG. 3, curve B.

EXAMPLE 4

The die with an 0.65 mm (0.026 inch) diameter opening used in previous examples was replaced by a die of similar design but with a 0.9 mm (0.036 inch) opening. The filament guide remained the same and was again positioned so its end was recessed from 0.8 mm ± 0.1 mm (0.072 ± 0.004 inch) from the face of the die. Using the same operating procedure, silica rod type, cladding polymer and spinning temperature as in examples 2 and 3, 200 μm filaments were spun at 6 and 10 m/min with extruder screw speeds adjusted to yield clad fibers with diameters of 1000, 870 and 625 μm. The resulting effect on attenuation is shown in Table II, part 3, and in FIG. 3, curve C.

COMPARATIVE EXAMPLE A

The die of example 4 was modified so the tip end of the filament guide was now flush with the face of the die, i.e. without any recess. Using the same operating procedures, silica rod type, cladding polymer and spinning temperature as in examples 2, 3 and 4, 200 μm filaments were spun with a wide variety of spinning rate and cladding thicknesses. The attenuations measured on these fibers were erratic and in no cases lower than 200 dB/km.

TABLE II

| Part | Die Opening (μm) | Clad Fiber Diameter (μm) | Melt Draw-down Ratio | Spinning Rate (m/min) | Attenuation* (dB/km) | Remarks |
|---|---|---|---|---|---|---|
| 1 | 0.65 | 825 | 0.56 | 3 | 260 | Constant extruder throughput, varying spinning rate. |
|  |  | 725 | 0.72 |  | 48 |  |
|  |  | 620 | 1 | 6 | 43 |  |
|  |  | 540 | 1.3 | 6 | 32 |  |
|  |  | 510 | 1.7 |  | 30 |  |
|  |  | 440 | 2.3 | 12 | 73 |  |
|  |  | 410 | 2.7 |  | 143 |  |
|  |  | 390 | 3.1 | 15 | 690 |  |
| 2 | 0.65 | 675 | 0.85 | 12 | 188 | varying extruder throughput, constant spinning rate. |
|  |  | 640 | 0.93 |  | 90 |  |
|  |  | 620 | 1.0 | 12 | 55 |  |
|  |  | 540 | 1.3 | 12 | 50 |  |
|  |  | 500 | 1.7 | 12 | 47 |  |
|  |  | 440 | 2.3 | 12 | 58 |  |
|  |  | 370 | 3.8 | 12 | 830 |  |
| 3 | 0.9 | 1000 | 0.76 | 6 | 61 |  |
|  |  | 870 | 1 | 10 | 49 |  |
|  |  | 625 | 2.2 | 6 | 165 |  |

*measured at 6328Å with He-Ne laser light source, collimated light.

EXAMPLE 5

The same operating procedure, coating die, silica rod type and spinning temperature as in example 2 were used, but the cladding polymer was a copolymer of tetrafluoroethylene and (7.5 to 1 mole ratio) having a melt index of 35 at 270° C. (measured by ASTM D-2116-66 with an 2.095 mm orifice and a weight of 4767 gm). Barrel temperatures ranged from 270° C. near the hopper to 290° C. At the die adapter. The die itself was kept at 310° C. By varying the take-off rate from 6 to 9 m/min and adjusting the extruder screw speed correspondingly, 200 μm fibers with different cladding thicknesses were produced. The effect of these variations in melt draw-down ratio on fiber optical attenuation is shown in Table III, and in FIG. 3, curve D.

TABLE III

| Clad Fiber Diameter (μm) | Melt Draw-Down Ratio | Spinning Rate (m/min) | Attenuation at 6328A (dB/km) |
|---|---|---|---|
| 725 | 0.72 | 7 | 250 |
| 620 | 1 | 6 | 270 |
| 600 | 1.1 | 6 | 200 |
| 540 | 1.3 | 8 | 93 |
| 440 | 2.3 | 9 | 355 |

EXAMPLE 6

The same operating procedure, coating die, silica rod type and spinning temperature as in example 5 were used, but the cladding polymer was a copolymer of tetrafluoroethylene and perfluoropropyltrifluorovinyl ether (ca. 96 to 4 weight ratio) having a melt viscosity of ca. $4 \times 10^4$ poises at 272° C. Barrel temperatures ranged from 280° C. near the hopper to 390° C. at the die adapter. The die itself was kept at 420° to 440° C. By varying the take-off rate from 6 to 9 m/min and adjusting the extruder screw speed correspondingly, 200 μm fibers with different cladding thicknesses were produced. The effect of these variations in melt draw-down ratio on fiber optical attenuation is shown in Table IV, and in FIG. 3, curve E.

TABLE IV

| Clad Fiber Diameter (μm) | Melt Draw Down Ratio | Spinning Rate (m/min) | Attenuation at 6328A (dB/km) |
|---|---|---|---|
| 640 | 0.93 | 6 | 1070 |
| 600 | 1.1 | 7 | 970 |
| 560 | 1.2 | 7 | 610 |
| 440 | 2.3 | 7 | 2500 |
| 410 | 2.7 | 9 | 4000 |

EXAMPLE 7

The same operating procedure, coating die, silica rod type and spinning temperature as in example 5 were used, but the cladding polymer was a copolymer of tetrafluoroethylene and ethylene (ca. 1:1 mole ratio) which also contained about 1.3 weight % side groups of the monovalent radical of hexafluoroisopropanol having a melt flow rate of ca. 8g/10 min at 297° C. (measured by ASTM D-2116, Section 10). Barrel temperatures ranged from 250° C. near the hopper to 350° C. at the die adapter. The die itself was kept at 360° to 380° C. By varying the take-off rate from 5 to 8 m/min, and adjusting the extruder screw speed correspondingly, 200 μm fibers with different cladding thicknesses were produced. The effect of these variations in melt draw-down ratio on fiber optical attenuation is shown in Table V, and in FIG. 3, curve F.

TABLE V

| Clad Fiber Diameter (μm) | Melt Draw Down Ratio | Spinning Rate (m/min) | Attenuation at 6328A (dB/km) |
|---|---|---|---|
| 640 | 0.93 | 5 | 1350 |
| 600 | 1.1 | 5 | 970 |
| 520 | 1.5 | 6 | 750 |
| 410 | 2.7 | 8 | 2000 |

It can be seen that the optimum draw-down ratios to achieve minimum attenuation of transmitted light for the different polymers in all of the Examples fall in the same range as defined hereinabove.

The present invention makes possible the preparation of polymer-clad silica-core optical fiber which has substantially improved transmission of light, i.e., substantially lower attenuation of transmitted light, when compared to prior known optical fibers of the same type. When the silica core is type TO-8 silica, with the use of the present invention, it is possible to make optical fibers whose attenuation of transmitted light is only about 20% higher than that of the TO-8 silica itself.

It is well known in the art that useful optical fiber can be prepared with a variety of glasses having a high silica content. Accordingly, use of the term silica herein is intended to refer not only to pure silica but also to glass compositions having a high silica content.

What is claimed:

1. In a process of forming an optical fiber comprising a silica filament core and a thermoplastic polymer cladding having an index of refraction lower than that of the core by
   (a) drawing a silica filament core from a molten mass of silica, and
   (b) melt coating a thermoplastic polymer having an index of refraction lower than that of the core onto the silica filament core,
   the improvement comprising:
   (i) in step (a), drawing the silica filament core at a temperature from 2040° C. to 2140° C. and
   (ii) in step (b), melt coating the polymer by extrusion at a draw down ratio from 1.2 to 2.0 without the filament core having touched a solid surface.

2. The process of claim 1 wherein said draw-down ratio is from 1.4 to 1.8.

3. The process of claim 1 wherein the polymer initially contacts the silica filament core within an extrusion die having an outlet for the filament core, said outlet being recessed within and internally spaced from an outlet from said die for the polymer.

4. The process of claim 1 wherein the thermoplastic polymer is substantially amorphous.

5. The process of claim 4 wherein the polymer is a copolymer of $$X(CF_2)_n(CH_2)_m OC-C=CH_2,$$
$$\quad\quad\quad\quad\quad\quad\;\; \| \;\; |$$
$$\quad\quad\quad\quad\quad\quad\; O \;\; Y$$

wherein X is F, H or Cl; Y is $CH_3$ or H; m is an integer from 1 to 6; and n is an integer from 2 to 10, with at least one of the methyl or ethyl esters of acrylic or methacrylic acids.

6. The process of claim 4 wherein the polymer is a copolymer of methyl methacrylate and $$\quad\quad\quad\quad\quad\quad\quad\quad\quad O \;\; CH_3$$
$$\quad\quad\quad\quad\quad\quad\quad\quad\quad \| \;\; |$$
$$CF_3CF_2(CF_2CF_2)_p CH_2CH_2O-C-C=CH_2$$

where p takes the values of integers from 1 to 8 with a major proportion being that where p is 2 and 3.

7. The process of claim 4 wherein the polymer is a copolymer of tetrafluoroethylene and $$CF_2=CF-O-CF_2-CF-O-CF_2-CF_2-SO_2F.$$
$$\quad\quad\quad\quad\quad\quad\quad\quad\; |$$
$$\quad\quad\quad\quad\quad\quad\quad\quad CF_3$$

8. The process of claim 1 wherein the polymer is a copolymer of tetrafluoroethylene and perfluoropropyl-trifluorovinyl ether.

9. The process of claim 1 wherein the polymer is a copolymer of tetrafluoroethylene and ethylene.

10. The process of claim 1 wherein the silica filament core has a diameter of 50 to 300 μm and the polymer cladding has a thickness of 50 to 500 μm.

* * * * *

UNITED STATES PATENT AND TRADEMARK OFFICE
CERTIFICATE OF CORRECTION

PATENT NO. : 4,116,654
DATED : September 26, 1978
INVENTOR(S) : Yves Michel Trehu It is certified that error appears in the above-identified patent and that said Letters Patent are hereby corrected as shown below:

Column 5, line 38, "thoughput" should read -- throughput --

Column 6, line 48, "(wt./vol.)" should read -- by weight --, and line 50, "by weight" should read -- (wt./vol.)--.

Column 8, line 5, "drawn" should read -- draw --.

Signed and Sealed this

Twenty-ninth Day of May 1979

[SEAL]

Attest:

RUTH C. MASON
Attesting Officer

DONALD W. BANNER
Commissioner of Patents and Trademarks